United States Patent
Divisi

(10) Patent No.: US 9,423,039 B2
(45) Date of Patent: Aug. 23, 2016

(54) PROGRESSIVE MODULAR DISTRIBUTOR

(71) Applicant: DROPSA S.p.A., Milan (IT)

(72) Inventor: Walter Divisi, Monaco (MC)

(73) Assignee: DROPSA S.P.A., Milan (IT)

( * ) Notice: Subject to any disclaimer, the term of this patent is extended or adjusted under 35 U.S.C. 154(b) by 168 days.

(21) Appl. No.: 14/068,576

(22) Filed: Oct. 31, 2013

(65) Prior Publication Data

US 2014/0124073 A1 May 8, 2014

(30) Foreign Application Priority Data

Nov. 6, 2012 (IT) ............... MI2012A1884

(51) Int. Cl.
*F16K 11/10* (2006.01)
*F16N 25/02* (2006.01)

(52) U.S. Cl.
CPC ............... *F16K 11/10* (2013.01); *F16N 25/02* (2013.01); *Y10T 137/86879* (2015.04); *Y10T 137/87885* (2015.04)

(58) Field of Classification Search
CPC ............... F16K 11/10; F16N 25/02; Y10T 137/87885; Y10T 137/268; Y10T 137/5109; Y10T 137/86879
USPC .......... 137/119.03, 884, 269; 184/7.4, 6, 29, 184/32, 39.1; 222/249–250
See application file for complete search history.

(56) References Cited

U.S. PATENT DOCUMENTS

| | | | |
|---|---|---|---|
| 2,792,911 A * | 5/1957 | Harter ............ | F16N 25/02 184/7.4 |
| 3,476,214 A * | 11/1969 | Callahan ............ | 184/7.4 |
| 3,921,760 A * | 11/1975 | Brownrigg ............ | 184/7.4 |
| 3,934,605 A * | 1/1976 | Legris ............ | F16L 37/26 137/884 |
| 5,628,384 A | 5/1997 | Mismas | |
| 5,725,255 A * | 3/1998 | Hayashi et al. ............ | 137/884 |
| 2010/0101672 A1 | 4/2010 | Roys | |

FOREIGN PATENT DOCUMENTS

| | | |
|---|---|---|
| DE | 102008011590 B3 | 7/2009 |
| EP | 0159633 A2 | 10/1985 |
| GB | 1107335 A | 3/1968 |

OTHER PUBLICATIONS

European Search Report and Written Opinion dated Jul. 22, 2013 for Italian patent application No. MI2012A001884.

* cited by examiner

*Primary Examiner* — Michael R Reid

(74) *Attorney, Agent, or Firm* — Vorys, Sater, Seymour and Pease LLP

(57) ABSTRACT

A progressive modular distributor device for the division between a plurality of outlets of a lubricant fluid, said distributor including a first and a second base between which are sandwiched at least three distributor modules. The bases being interconnected by tie rods which pass through openings in the modules. A first surface of at least one of the modules presents at least one projecting part integral with the module. A second surface of a second of the modules, resting on the first, presents a corresponding housing in which the projecting part is inserted. The projecting part and the housing shaped to prevent reciprocal movement of the first and second module at least along an axis perpendicular to an axis of the tie rods when the projecting part is inserted in the housing.

22 Claims, 7 Drawing Sheets

Fig. 5A  Fig. 5B

PROGRESSIVE MODULAR DISTRIBUTOR

CROSS-REFERENCE TO RELATED APPLICATIONS

This claims the priority of Italian Patent Application No. MI2012A001884 filed on 6 Nov. 2012.

BACKGROUND OF THE INVENTION

1. Field of the Invention

The present invention relates to a progressive modular distributor for volumetric division, between a plurality of outlets, of a lubricant fluid.

2. Description of the Related Art

The lubricant fluid may be oil or grease supplied under pressure to the distributor. Said distributors are currently marketed by the applicant with the trade name SXO and are formed of a plurality of progressive distributor elements sandwiched between two bases.

The system uses a single input line and distributes incoming lubricant to a series of outlets. The lubricant is sent to the outlets sequentially. The distributor of lubricant fluid to the various outlets is volumetric and therefore always perfectly controllable.

The system provides a plurality of modular elements (or modules), each provided with two lubricant outlets. Depending on the number of outlet lines necessary, more modules may be added, which must simply be positioned between the two sandwiched bases.

Each module provides a series of passages which send the lubricant fluid to the modules upstream and guarantee their functioning.

In particular, each modular element provides a mobile cylinder inside it which has two operating positions. When the cylinder passes from one operating position to the other, it supplies to the device outlets a pre-set quantity of lubricant.

The modules have internal passages and the cylinders with a shape of a known type, such that the cylinders of each module move in sequence first towards the first operating position, then towards the second, following a pre-set cycle.

Therefore, with a single line to distribute the lubricant, total control of the system is allowed by means of a single sensor mounted on any one of the pistons (distributor elements).

As the movement of one piston is the essential condition for movement of the following position, all the progressive distributors of a system are connected in series and if a piston of any one of the distributors blocks off, even if belonging to another pack, the entire system therefore automatically blocks off.

This feature is very important for control of a centralized system: it is, in fact, sufficient to control with a micro-switch or with a magnetic reader or, better, with an inductive sensor, any outlet of a distributor to control the entire system.

As known, in order to allow 'modular' construction of the passages of fluid between the different modules, there are holes on the surfaces of all the modules. When two surfaces of two successive modules are rested, the various holes are aligned and, by means of appropriate O-rings, sealed passages are created between two successive modules.

The pressures in play in these devices are extremely high, so the surfaces of two adjacent modules must be perfectly resting to avoid leakage.

When standard tie rods are used, the modules and the bases must be positioned on a perfectly horizontal surface and the tie rods tight as a consequence.

However, this technique is laborious and often not possible 'in the field', for example during plant maintenance.

Therefore, in order to keep the modules aligned with each other, it has been chosen to make calibrated holes in each module, inside which the tie rods, also calibrated, pass, to maintain alignment.

Use of tie rods for centring the various modules is very impractical. It is, in fact, necessary to manufacture ad hoc tie rods, with a perfectly calibrated diameter and therefore extremely expensive.

Further, during assembly, it is extremely difficult to insert the tie rod in the holes, in view of the minimum tolerances necessary to ensure the centering function of the coupling.

A cost problem therefore exists in the prior art, relating to manufacturing calibrated holes on the modules, purchase of special tie rods (the length of which must also be adapted every time to the number of modules) and the assembly times, which are lengthy and must be performed by skilled operators.

There is also a problem strictly linked with maintenance. Each time a module must be replaced, it is necessary to remove the tie rods and dismantle the entire distributor.

BRIEF SUMMARY OF THE INVENTION

The object of the present invention is therefore manufacturing a distributor which is less expensive and more reliable than those of the prior art, which is easy and quick to assemble, even by unskilled operators.

These and other objects are achieved by manufacturing a distributor according to the teachings of the appended claims.

Advantageously, the distributor of the present invention has easy maintenance, since it is possible to replace one or more damaged modules without having to dismantle the distributor completely.

BRIEF DESCRIPTION OF THE DRAWINGS

Further characteristics and advantages of the invention will become more apparent from the description of a preferred, but not exclusive, embodiment of the distributor, illustrated by way of a non-limiting example in the appended drawings, wherein:

FIGS. 5A and 5B are partial cross-sections taken respectively along the cross-section line 5A-5A of FIGS. 5 and 5B-5B of FIG. 7;

DETAILED DESCRIPTION OF THE INVENTION

With reference to the aforesaid figures, reference number 1 is used to denote a progressive modular distributor in its entirety.

This comprises a first base 2 and a second base 3, between which are sandwiched by a pair of tie rods 5 a plurality of modules 4A, 4B, 4C, 4D, all functionally identical.

Figure 1:
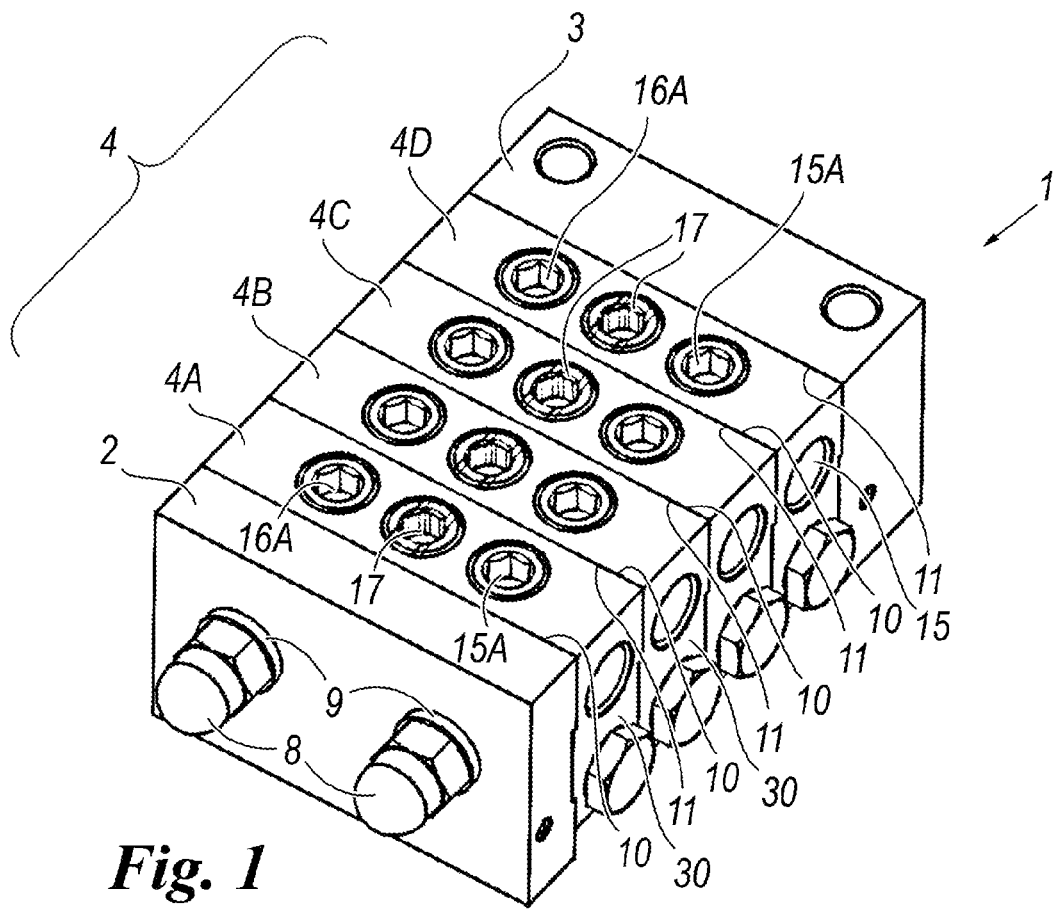
FIG. 1 is a perspective view of a distributor according to the present invention.
Figure 2:
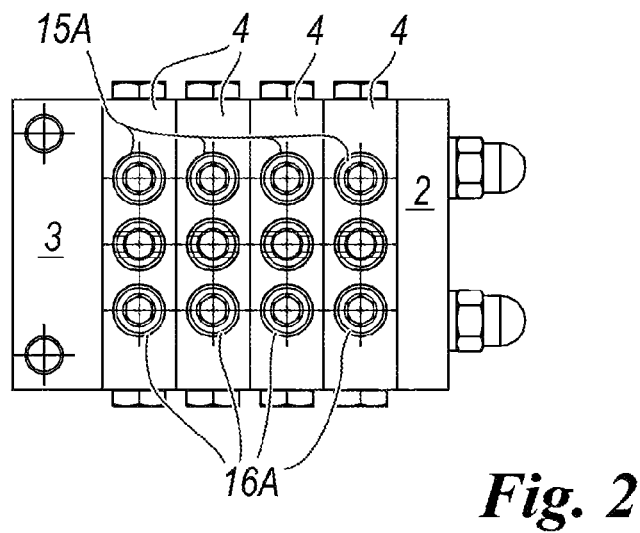
FIG. 2 is a view from above of the distributor of FIG. 1.
Figure 3:
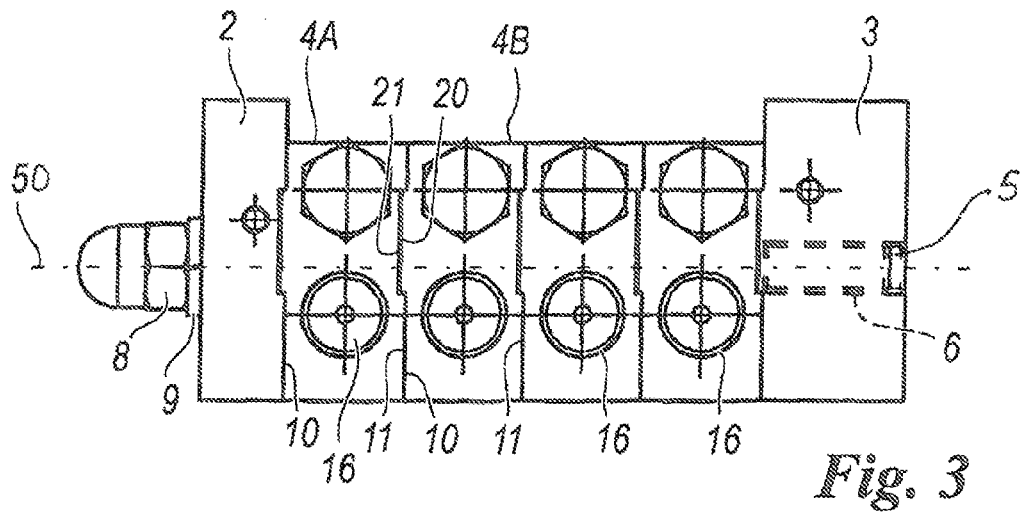
FIG. 3 is a view from above of the distributor of FIG. 1.
Figure 4:
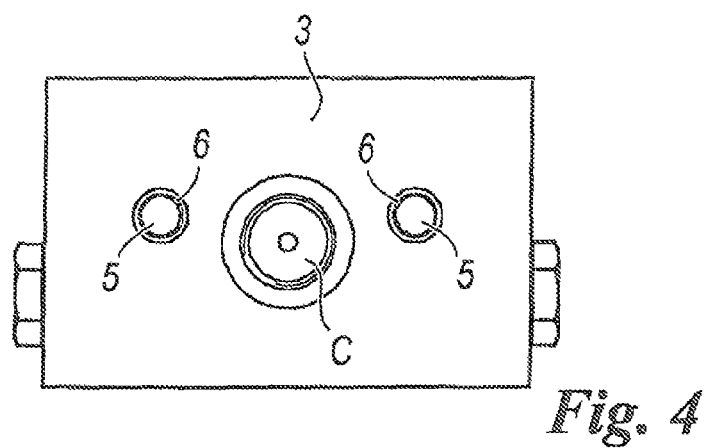
FIG. 4 is a front view of the distributor of FIG. 1.

As shown in FIG. 3, each tie rod 5 has a longitudinal axis 50.

As visible in FIG. 3, the tie rods are screwed into the second base, in appropriate threaded holes 6, pass through the modules 4 (and specifically through openings 7 envisaged precisely for this purposes in them), through the first base 2, and are tightened by appropriate bolts 8. The usual washers 9 present between the outer surface of the first base 2 and the bolts 8 are envisaged.

Each module (see FIGS. 5 and 7) is provided with a first 10 and a second 11 surface arranged to couple respectively with the second 11 and first 10 surfaces of other functionally identical modules. The first 10 and second 11 surfaces have a plurality of surface holes A, B, C, D, E, F, G, H, I, arranged so that, when the two modules are resting with the second surface 11 of the first module (for example 4A) superimposed on the first surface 10 of the second module (for example 4B), is the surface holes of the first and the second surface create channels arranged for passage of the lubricant fluid between the two rested modules.

Figure 13:
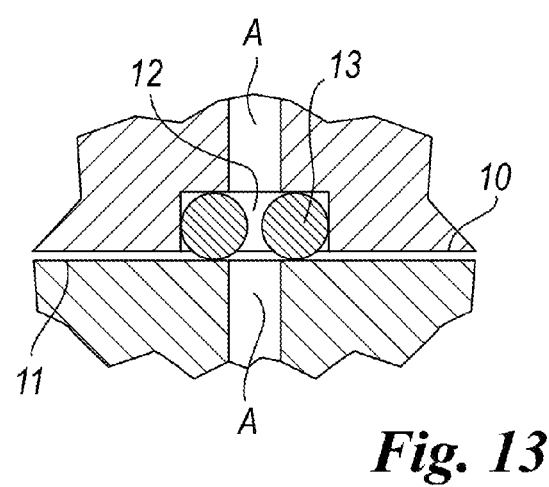
FIG. 13 shows a detail of a coupling between two modules with a simplified cross-section.

It should be noted that, on the first surface, in addition to said holes, there are housings 12 for O-rings 13, which guarantee the creation of sealed channels between the modules. The coupling which leads to formation of the passages is clearly visible in FIG. 13.

Figure 7:
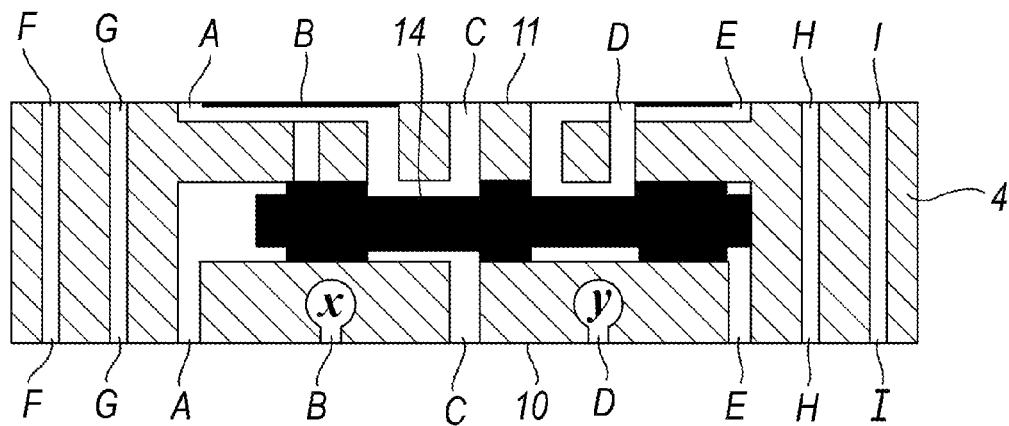
FIG. 7 is a simplified view which illustrates the passages present in the module of FIG. 5.

Each module comprises (see FIG. 7) a piston 14 mobile inside it between a first and a second limit position (in FIG. 7, the piston is in the second limit position). It is also possible to provide a module provided with three pistons.

As is visible in the exploded view, the piston is maintained in position by appropriate threaded closures 18 inserted in the module. On the distributor, it is possible to replace one of said closures with a movement sensor of the piston (magnetic or inductive). It is sufficient to monitor movement of a single piston to understand whether all the pistons present in the module are moving normally. In fact, if even one piston only blocks off, all the others block off as a consequence, since the distributor is the progressive modular type.

The various chambers which are formed according to the position of the piston are connected by appropriate passages which lead onto the first or the second surface of the module precisely at surface holes A, B, C, D, E. As visible in FIG. 7, there are also substantially direct passages which present at their reciprocal ends the holes indicated with letters F, G, H and I.

The modules 4 each comprise a first 15 and a second 16 principal lubricant outlet, which will be appropriately connected, in use, to a supply point (for example pipes). Advantageously, each module has a first 15A or second 16A outlet controllable alternatively to the principal outlets and arranged on a different side of the module with respect to the one where said first and second outlets are realized.

Furthermore, each module has a bypass device, arranged to interconnect said first outlet with said second outlet so as to sum together the volumetric quantity of lubricant fluid supplied.

Figure 8A:
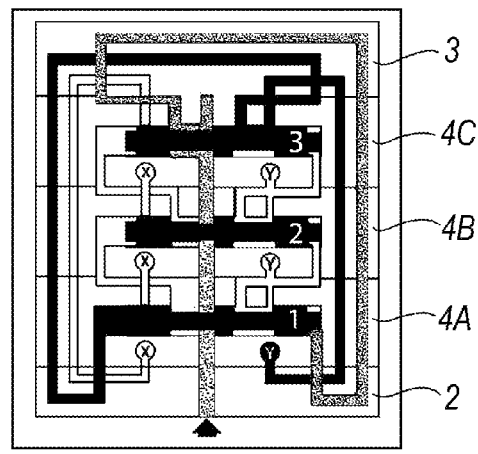
FIGS. 8A, 8B and 8C show in sequence the various operating steps of the distributor of FIG. 1, in a 3-module version.
Figure 8B:
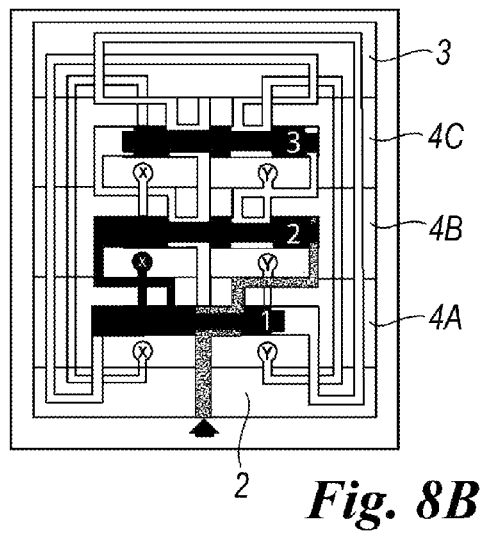
Figure 8C:
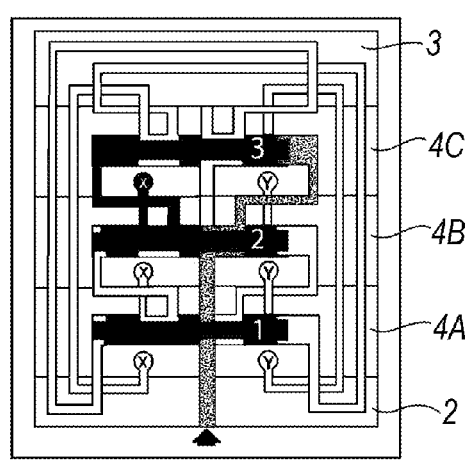

In an entirely known and standard way for a person skilled in the art and as shown schematically in the sequence of FIGS. 8A, 8B and 8C, movement of the piston in said first or second operating position causes supply of the lubricant fluid through one of the outlets of the distributor, in a progressive way.

It may be noted that for functioning of the distributor, said bases provide at least one surface destined to couple with the first or the second surface of said modules. The first base 2 will couple with the first surface 10 of the first module 4A, while the second base 3 will couple with the second surface of the fourth module 4D.

The surface of each base destined to couple with the modules will also have a plurality of holes arranged so that, when said surface of the base is superimposed with the first or the second surface of one of said modules, the surface holes of the first or second surface of the module and the basis create channels arranged to allow passage of the lubricant fluid between the module and the base.

The configuration of the passages in the bases is schematically visible in FIGS. 8A-8C.

Conceptual functioning of the invention described so far is standard and easily obtainable by a person skilled in the art who knows the progressive distributors of the SXO range marketed by Dropsa SPA perfectly.

Figure 6:
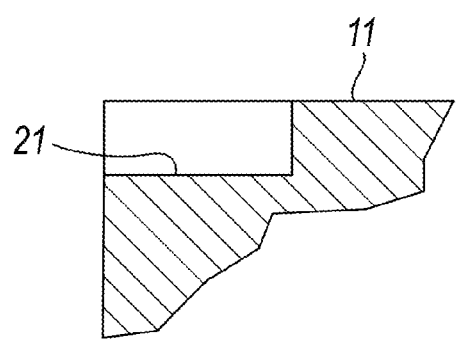
FIG. 6 is a front view of the module of FIG. 5.
Figure 6:
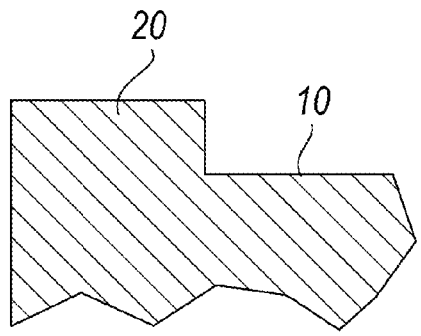
Figure 6:
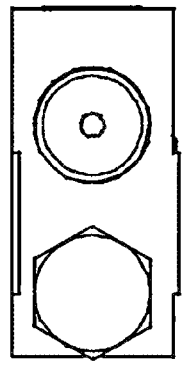

According to the present invention, a first surface 10 of at least one of said modules has at least one projecting part 20 integral with the module, and a second surface 11 of a second of said modules rests on the first 10, has a housing 21 (recess 21) corresponding with said projecting part 20, said projecting part 20 and said housing 21 (recess 21) being shaped so as to prevent reciprocal (transverse) movement of the first and second module relative to each other and at least along an axis perpendicular to an axis 5 of said tie rods when the projecting part 20 is inserted in the housing 21. The projecting part 20 and the housing 21 (recess 21) of each module 4 and base 2 and 3 is configured to center the modules 4 and bases 2 and 3 relative to each other when assembled together. Specifically, the projecting part 20 of each module 4 and base 3 are configured to nest within the housing 21 (recess 21) of the adjacent module 4 and base 2 to align same and prevent relative lateral movement between the assembled modules 4 and bases 2 and 3. The projecting part 20 and or housing 21 (recess 21) of each module 4 and base 2 and 3 is located at a center portion of each respective connecting surface of each module 4 and base 2 and 3, as shown in FIGS. 3 and 6. The projecting part 20 is provided with opposite side contact surfaces configured to contact with opposite contact surfaces of each housing 21 (recess 21) when assembled together to prevent lateral movement between the assembled modules 4 and bases 2 and 3.

Advantageously, as is clearly visible in FIGS. 5, 7, 1 and 3, the bases 2, 3 and all the modules 4 have housings 21 and projecting parts 20, at least at the surfaces which are reciprocally resting between them.

It should be noted that each module provides at least two housings 21 and two projecting parts 20 which are arranged at the side edges of each of said modules.

According to the embodiment described here, the projecting parts (and consequently the housings) have a shape with an arched cross-section.

However, circular, semi-circular or rectangular shaped projecting parts and housings may also be provided, developing in a perpendicular direction with respect to the axis of said tie rods (this is the embodiment of FIG. 11, which will be described below).

It should be noted that the presence of the projecting parts on the first surface of each module does not have a negative influence on the production costs of the modules.

In fact, both the first and the second surface of each module must be precisely milled and smoothed to obtain optimum seal at working pressures. Errors in flatness of said surfaces would cause inevitable spills and leakages.

Since said processing is currently performed on digitally controlled machines, there is only a slight increase in the processing times for milling the first surface. In contrast, for realization of the second surface, it is sufficient to create two slightly misaligned dead holes with respect to the edge of the piece.

The tolerances with which the projecting parts 20 and housings 21 are obtained will obviously be such as to allow appropriate centering between the two reciprocally rested modules.

It will thus be possible to realize the openings 7 with a circular cross-section for passage of the tie rods into the modules without any particular tolerances and the tie rods 5 will be of the standard type.

During assembly of the distributor, relative centering between the modules, and between the modules and the bases, occurs automatically by means of the projecting parts and the housings. Assembly is therefore extremely simple and rapid and it is unnecessary to provide perfectly flat surfaces on which to rest the modules, which are effectively fixed into each other (obviously with slight clearance), maintaining excellent stability before being blocked definitively by the tie rods.

Said configuration also certainly facilitates all maintenance operations. Replacement of a module no longer, in fact, requires specific assembly equipment to guarantee that all the modules are perfectly aligned.

Basically, with the present invention, it is possible to guarantee that the first and second surfaces of each modules, reciprocally rested on each other, are perfectly flat, thus guaranteeing seal of the channels which are created between the various modules and avoiding leakage of lubricant caused by the fact that the first and second surfaces may rest not perfectly flat one with the other.

Figure 9:
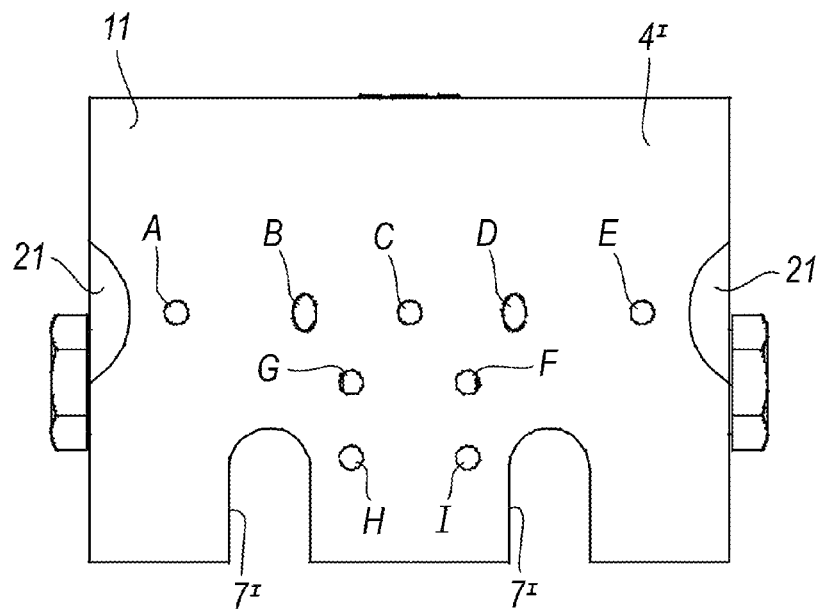
FIG. 9 shows a lateral view of a different embodiment of the module of FIG. 5.

FIG. 9 shows an alternative embodiment of the modules 4 which is even more efficient during maintenance operations.

In the rest of the text, the same reference numbers will be used to indicate functionally identical parts to those already described above. Said parts will therefore not be described again.

Figure 5:
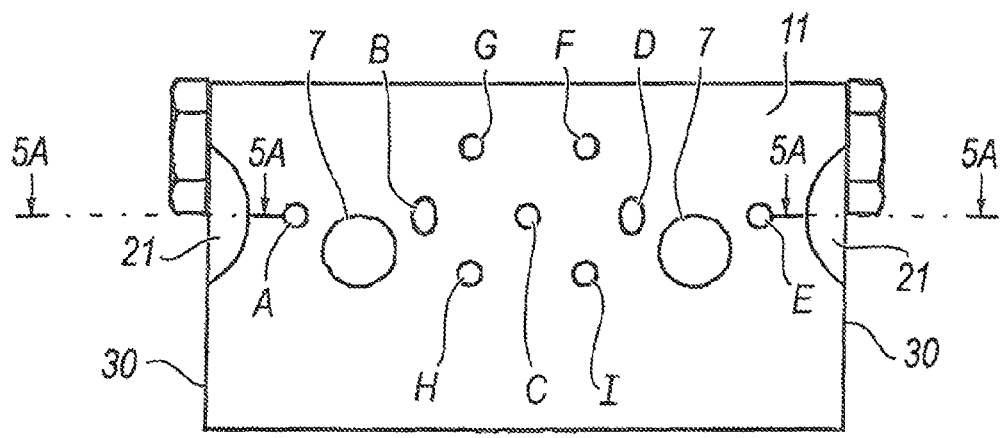
FIG. 5 is a lateral view of a module which forms the distributor of FIG. 1, when the module is disassembled from the distributor.
Figure 10:
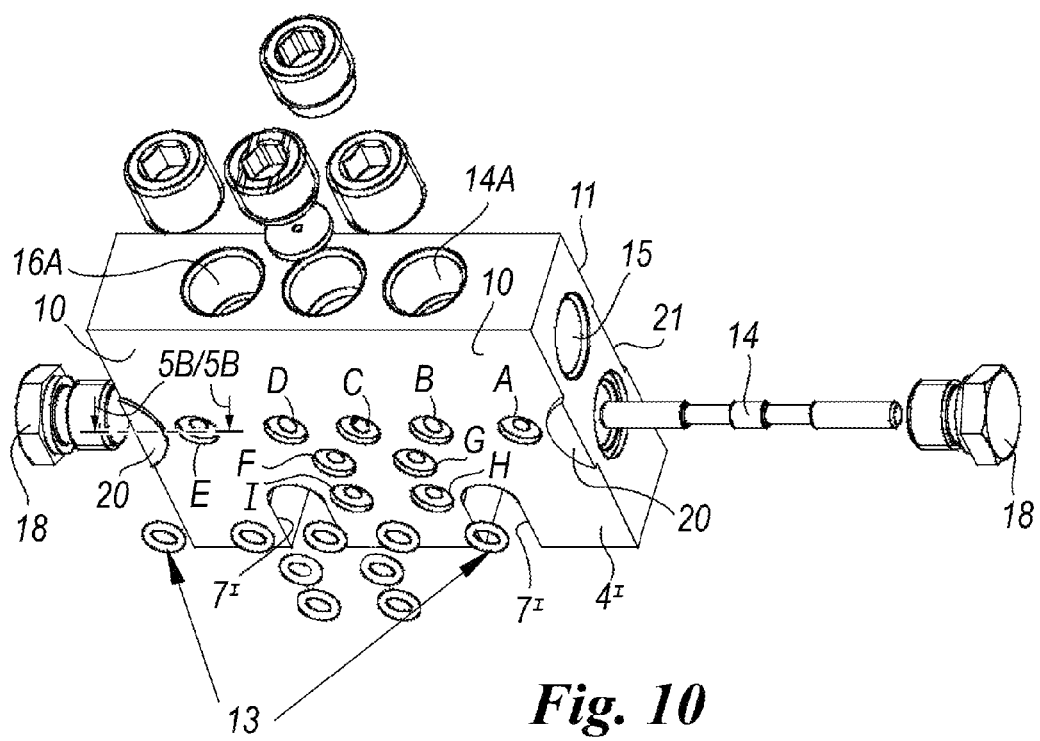
FIG. 10 is an exploded perspective view of the module of FIG. 9.

As may be seen, the fundamental difference between the module of FIG. 5 and module 4' of FIGS. 10 and 9 is the shape of the openings 7 for passage of the tie rods. Here, the openings have a U-shaped cross section, with an opening towards one of the sides of the module.

In this manner, following loosening of the tie rods until disengagement of the housings and projecting parts of the module to be replaced from those of the surrounding modules, it is possible to extract solely the faulty module, maintaining the rest of the device assembled. With said configuration, it is therefore no longer necessary to disassemble the distributor completely, removing the tie rods from their housings.

It should be empathized that, in said configuration, all the modules will have openings 7 which are basically U-shaped, whereas the first and second bases will have normal through-holes for passage of the tie rods.

It should be noted that, in this embodiment, the arrangement of holes A, B, C, etc., is slightly different to what is visible in the embodiment of FIG. 5 or 7, in order to balance better the traction caused by the tie rods and in order to have a free space beneath the tie rods which allows extraction of the module when the tie rod is not tightened.

Figure 11:
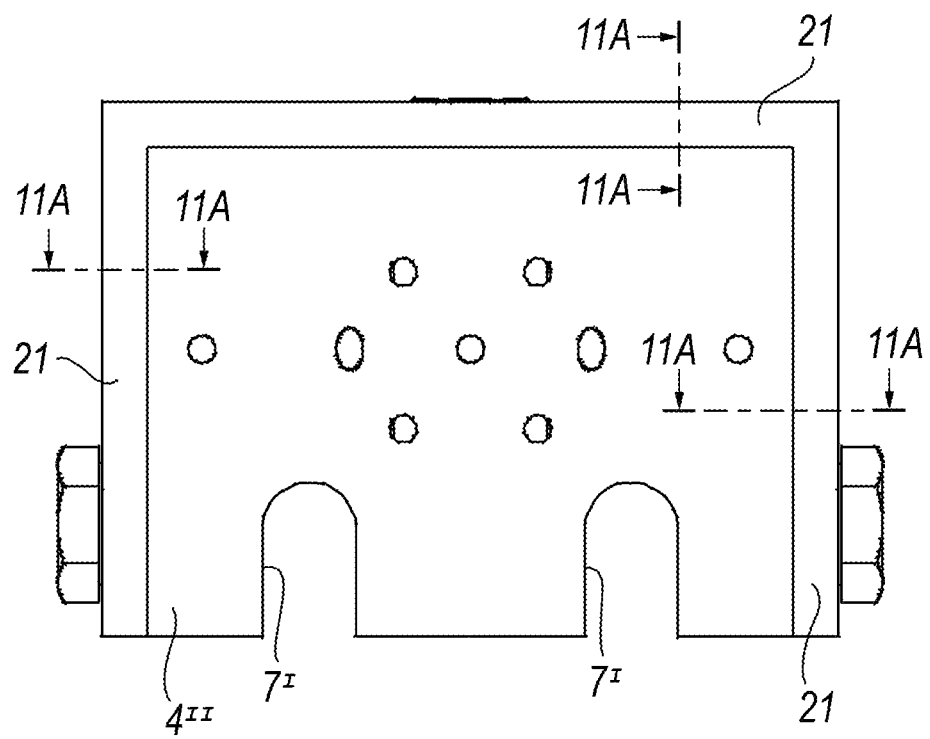
FIG. 11 shows a lateral view of a different embodiment of the module of FIG. 5.
Figure 11A:
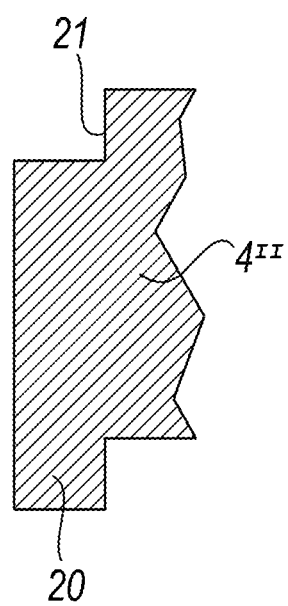
FIG. 11A is a partial and simplified cross-section taken along lines 11A-11A of FIG. 11.
Figure 12:
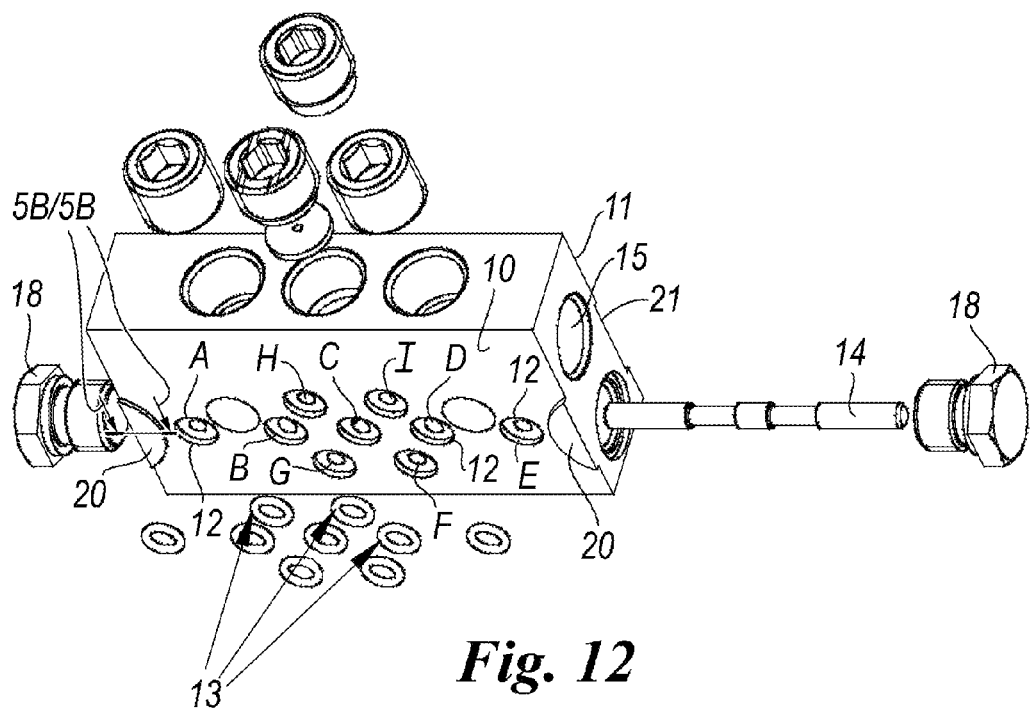
FIG. 12 is a exploded view of the module of FIG. 5.

FIG. 11 shows an alternative embodiment of the invention. As may be seen, in this configuration the housings and projecting parts have a rectangular cross-section. The lateral projecting parts/housings develop in a perpendicular direction with respect to the axis of said tie rods, whereas a further housing/projecting part is present on the long side of the parallelepiped which defines module 4", perpendicular to the first two.

This configuration prevents reciprocal movement of the modules in three perpendicular directions to the axis of the tie rod, allowing easy extraction of an individual module simply by loosening the tie rods slightly. The module is, in fact, free to be extracted in a direction corresponding with the top of FIG. 11. It remains blocked, on the other hand, in translation to the right, to the left or downwards, again with reference to FIG. 11. U-shaped passages for the tie rods are also present in this embodiment.

It should be noted that, according to the present invention, various configuration of the housings/projecting parts which perform centering between two reciprocally rested modules may be envisaged.

The invention claimed is:

1. A progressive modular distributor device for division of a lubricant fluid between a plurality of outlets, said distributor comprising:
   a first base and a second base between which said first base and said second base are sandwiched at least three distributor modules, the first and second bases being interconnected by tie rods; the tie rods each having at least a longitudinal axis, at least portions of said longitudinal axis passing through openings in each of said at least three modules,
   each of said modules being provided with a first surface and a second surface arranged to couple respectively with second and first surfaces of other functionally identical modules,
   said first and second surfaces presenting a plurality of surface holes arranged so, when two modules are rested with the second surface of the first module superimposed on the first surface of the second module, the surface holes of the first and the second surfaces create channels arranged for passage of the lubricant fluid between two rested modules,
   each module comprising inside it at least one piston mobile between a first and a second limit position, and at least a first lubricant outlet and a second lubricant outlet, so, on movement of the piston into said first or said second limit position, the lubricant fluid is supplied through one of the outlets of the distributor,
   each of said bases comprising at least a surface for coupling with one of the first or second surface of said modules,
   said surface of the base defining a plurality of holes arranged so, when said surface of the base is superimposed with the first or the second surface of one of said modules, the surface holes of the first or second surface of the module and the base create channels arranged for passage of the lubricant fluid between the module and the base, said first surface of at least one of said modules defining at least one projecting part integral with said module, and said second surface of an adjacent module resting on said first surface, and defining a housing corresponding with said projecting part, said projecting part and said housing shaped to prevent reciprocal movement of said first and said second module along at least one axis perpendicular to the longitudinal axis of said tie rods when the projecting part is inserted in the housing, so, when said modules and said bases are assembled together by means of the tie rods, coupling on a plane between the first and second surfaces of said modules and said bases is achievable, and said projecting part and said housing of each module and base being configured to center said modules and bases relative to each other when assembled together, wherein each said housing comprises a recess, wherein all the modules and the bases have said housings and projecting parts, at least at the surfaces reciprocally resting between them, wherein said projecting part of each module and base are configured to nest with the housing recess of the adjacent module or base to prevent relative lateral movement between the assembled modules and bases, wherein each said module is provided with opposed lateral edges and each said module is provided with opposed transverse edges perpendicular to said lateral edges, wherein said projecting part of each module and base are configured to nest with the housing recess of the adjacent module or base to prevent relative lateral movement in a lateral direction between the assembled modules and bases and prevent transverse movement in a direction perpendicular to the lateral direction between a mated position when the modules are centered and an extracted position that crosses more than one transverse edge of the module.

2. The device according to claim 1, wherein said housings and projecting parts are configured to prevent reciprocal movement of the first and the second module in all directions on a plane perpendicular to the longitudinal axis of said tie rods, or to allow reciprocal movement of the first and second module on a plane perpendicular to the longitudinal axis of said tie rods solely in the extraction direction.

3. The device according to claim 1, wherein each module has at least first and second housings and at least first and second projecting parts and wherein said first and second housings and said first and second projecting parts are arranged at the lateral edges of each of said modules.

4. The device according to claim 1, wherein each module has at least two housings and two projecting parts and wherein said housings and said projecting parts are arranged at the lateral edges of each of said modules.

5. The device according to claim 1, wherein said housings and said projecting parts have a shape selected from the group consisting of a semi-circular and/or arced cross-section, and a rectangular cross-section with respect to the longitudinal axis of said tie rods, wherein each projecting part and housing of each module and base is located at a center portion of each respective surface of each module and base.

6. The device according to claim 1, wherein said openings in the modules for passage of the tie rods are through-holes.

7. The device according to claim 1, wherein said openings have a U-shaped configuration and are open at one side of each module, to allow, following loosening of said tie rods, extraction of any module for the module's replacement, maintaining the rest of the device assembled.

8. The device according to claim 1, wherein the holes creating said channels house O-rings which allow sealed passage of the lubricant fluid from one module to another.

9. The device according to claim 1, wherein each module has a further first or second outlet arranged on a different side of the module with respect to the side of the module where said first and second outlets are located.

10. The device of claim 1, wherein said at least three distributor modules comprise four distributor modules.

11. The device of claim 10, wherein at least portions of said longitudinal axis of the tie rods passes through each of said four distributor modules.

12. The device of claim 1, wherein at least one end of the tie rods are screwed into one of the bases.

13. The device of claim 7, wherein the U-shaped openings are provided on only one side of each module.

14. The device according to claim 1,
wherein the projecting part, to center said modules and bases relative to each other when assembled together each module, is provided on one connecting surface and the housing recess in the opposite connecting surface,
wherein each base is provided either with a projecting part provided on the connecting surface or the recess provided in the connecting surface, and
wherein the projecting part of each module or base is configured to nest within the recess of each adjacent module or base to align and connect the bases and the one or more modules together and to prevent lateral movement between the bases and the one or more modules relative to a length of the distributor device.

15. The distributor device of claim 3, wherein each said module is provided with opposed first and second transverse edges perpendicular to said lateral edges, and further comprises a third said housing on the first transverse edge of the first surface and a third projecting part on the first transverse edge of the second surface.

16. The distributor device of claim 14, wherein each projecting part is provided with opposite sides configured to contact with opposite sides of each recess when assembled together.

17. The device according to claim 1, wherein each module has a first said housing and a second housing for respectively mating with a first projecting part and a second projecting part, the first said housing spaced from the second spaced housing, the first projecting part spaced from the second spaced projecting part.

18. The device according to claim 1, wherein the at least one projecting part integral with said module, and said housing corresponding with said projecting part are adapted and configured such that movement of the module is possible only when the tie rods are not fastened.

19. A progressive modular distributor device comprising:
a first base having a connecting surface;
a second base having a connecting surface;
one or more modules located between the first base and second base when the one or more modules and bases are assembled together, each module being provided with connecting surfaces located on opposite sides thereof; and at least one piston disposed within each module and movable between a first limit position and a second limit position so that upon movement of the piston into the first limit position or the second limit position lubricant fluid is selectively supplied to outlets of the distributor device, a plurality of tie rods connecting together the first base, the second base, and the one or more modules when assembled together, wherein the connecting surface or surfaces of each base and each module comprises a plurality of surface holes arranged so that when the bases and the one or more modules are assembled together the surface holes are superimposed relative to each other to create channels arranged for passage of the lubricant fluid between the bases and the one or more modules, wherein each module is provided with a projecting part on one connecting surface and a recess provide in the opposite connecting surface, wherein each base is provided either with a projecting part provided on the connecting surface or a recess provided in the connecting surface, and wherein the projecting part of each module or base is configured to nest within the recess of each adjacent module or base to align and connect the bases and the one or more modules together and to prevent lateral movement between the bases and the one or more modules relative to a length of the distributor device, wherein each said housing comprises a recess, wherein all the modules and the bases have said housings and projecting parts, at least at the surfaces reciprocally resting between them, wherein said projecting part of each module and base are configured to nest with the housing recess of the adjacent module or base to prevent relative lateral movement between the assembled modules and bases, wherein each said module is provided with opposed lateral edges and each said module is provided with opposed transverse edges perpendicular to said lateral edges, wherein said projecting part of each module and base are configured to nest with the housing recess of the adjacent module or base to prevent relative lateral movement in a lateral direction between the assembled modules and bases and prevent transverse movement in a direction perpendicular to the lateral direction between a mated position when the modules are centered and an extracted position that crosses more than one transverse edge of the module.

20. The distributor device of claim 19, wherein the projecting parts and recesses of the modules and bases are configured to center each adjacent module and base when assembled together.

21. The distributor device of claim 20, wherein each projecting part is provided with opposite sides configured to contact with opposite sides of each recess when assembled together.

22. The distributor device of claim 19, wherein each module has at least first and second housings and at least first and second projecting parts and wherein said first and second housings and said first and second projecting parts are arranged at the lateral edges of each of said modules.

* * * * *